United States Patent [19]

McNamara et al.

[11] Patent Number: 5,088,111
[45] Date of Patent: * Feb. 11, 1992

[54] MODULATION AND DEMODULATION SYSTEM EMPLOYING AM-PSK AND FSK FOR COMMUNICATION SYSTEM USING DIGITAL SIGNALS

[75] Inventors: Robert P. McNamara, San Jose; Timothy P. Murphy, Mountain View, both of Calif.

[73] Assignee: First Pacific Networks, Sunnyvale, Calif.

[*] Notice: The portion of the term of this patent subsequent to Jan. 28, 2009 has been disclaimed.

[21] Appl. No.: 317,214

[22] Filed: Feb. 28, 1989

[51] Int. Cl.[5] .................. H04L 25/34; H04L 25/49
[52] U.S. Cl. .................................... 375/18; 375/42
[58] Field of Search ............... 375/18, 86, 42, 48; 370/71, 53, 85.1, 85.9; 455/3-5; 358/86

[56] References Cited

U.S. PATENT DOCUMENTS

| | | | |
|---|---|---|---|
| 4,020,289 | 4/1977 | Anderson | 370/71 |
| 4,210,779 | 7/1980 | Simokat | 370/71 |
| 4,313,205 | 1/1982 | Rhodes | 375/86 |
| 4,425,666 | 1/1984 | Groth, Jr. | 375/48 |
| 4,426,710 | 1/1984 | Pommier | 375/18 |
| 4,498,169 | 2/1985 | Rozmus | 370/85.9 |
| 4,520,492 | 5/1985 | Weber | 375/86 |
| 4,574,284 | 3/1986 | Feldman et al. | 370/94.1 X |
| 4,686,490 | 8/1987 | Cressey | 375/62 X |
| 4,712,240 | 12/1987 | Schnerk | 375/18 X |

Primary Examiner—Benedict V. Safourek
Assistant Examiner—Tesfaldet Bocure
Attorney, Agent, or Firm—Townsend and Townsend

[57] ABSTRACT

A communication network having a first broadband communications channel or transmitting bus and a second broadband communications channel or receiving bus, wherein the first broadband communications channel is for passing information upstream to a head end and the second broadband communications channel is for passing information downstream from the head end to remote nodes. All nodes of the system are coupled to both the first communications channel and the second communications channel. According to the invention, modulation of signals applied to the first communication channel is optimized for burst communication from a plurality of sources to central control at the head end, and modulation applied to the second communications channel is optimized for continuous communication from the central source to a target node.

16 Claims, 4 Drawing Sheets

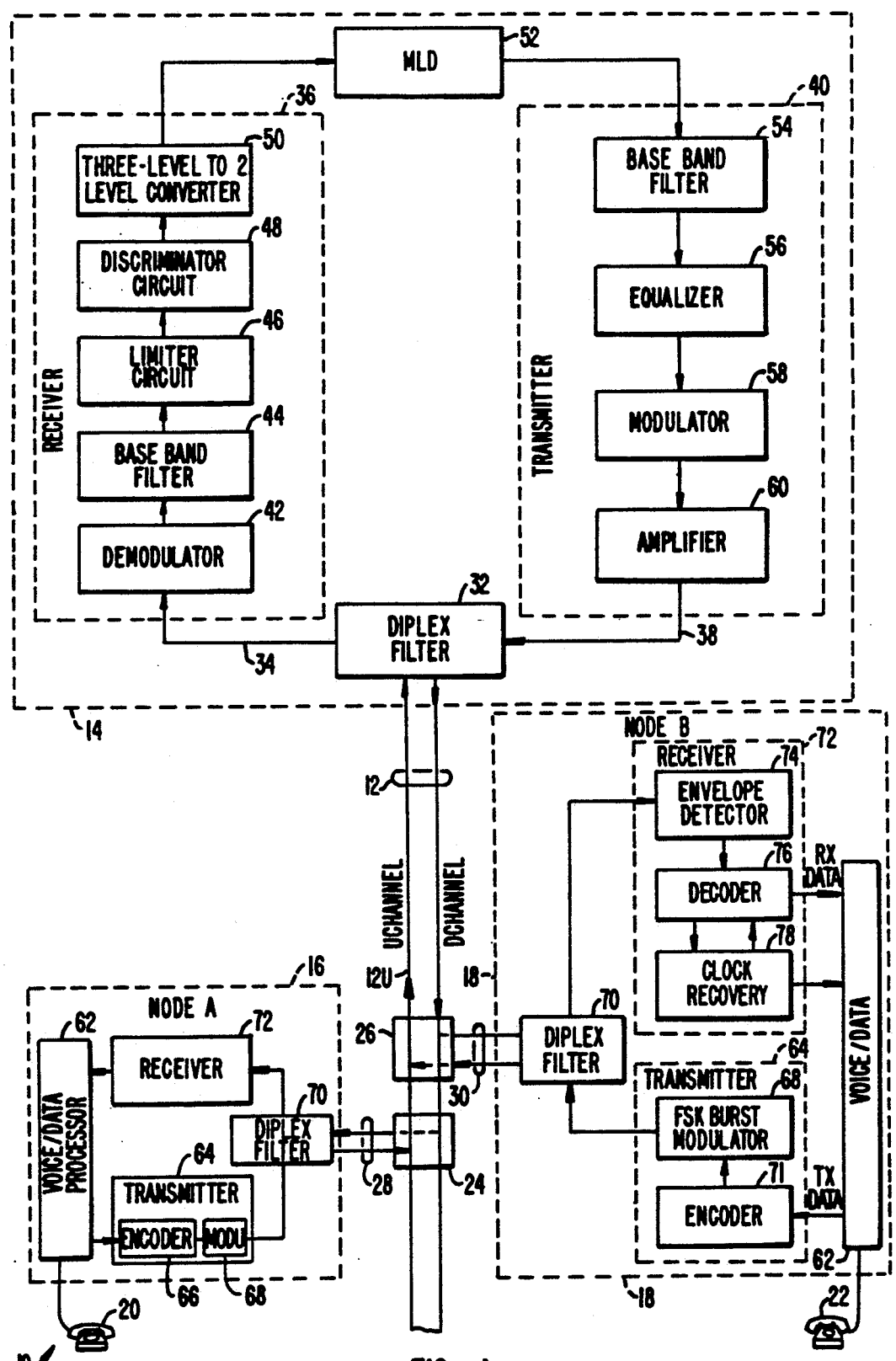
FIG._1.

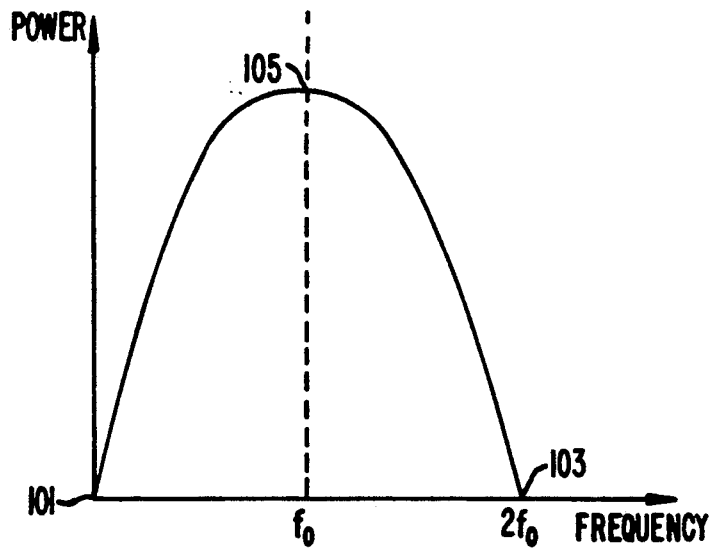
FIG._2.
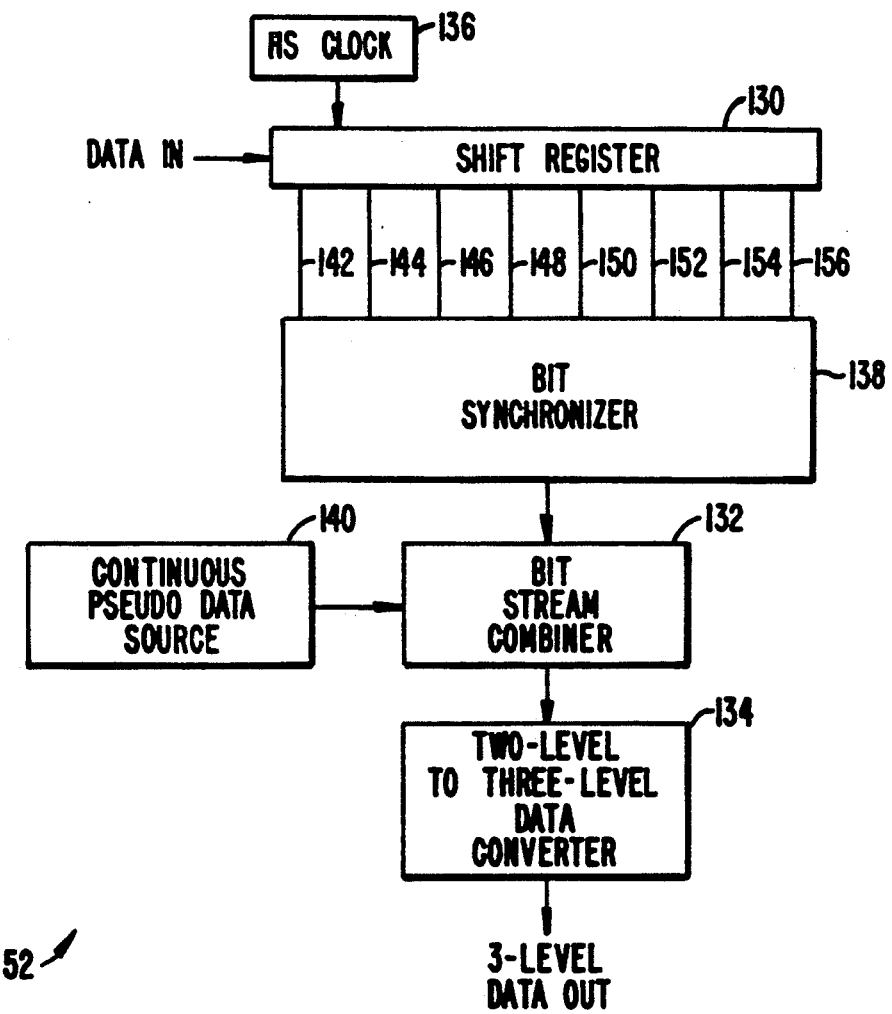
FIG._4.

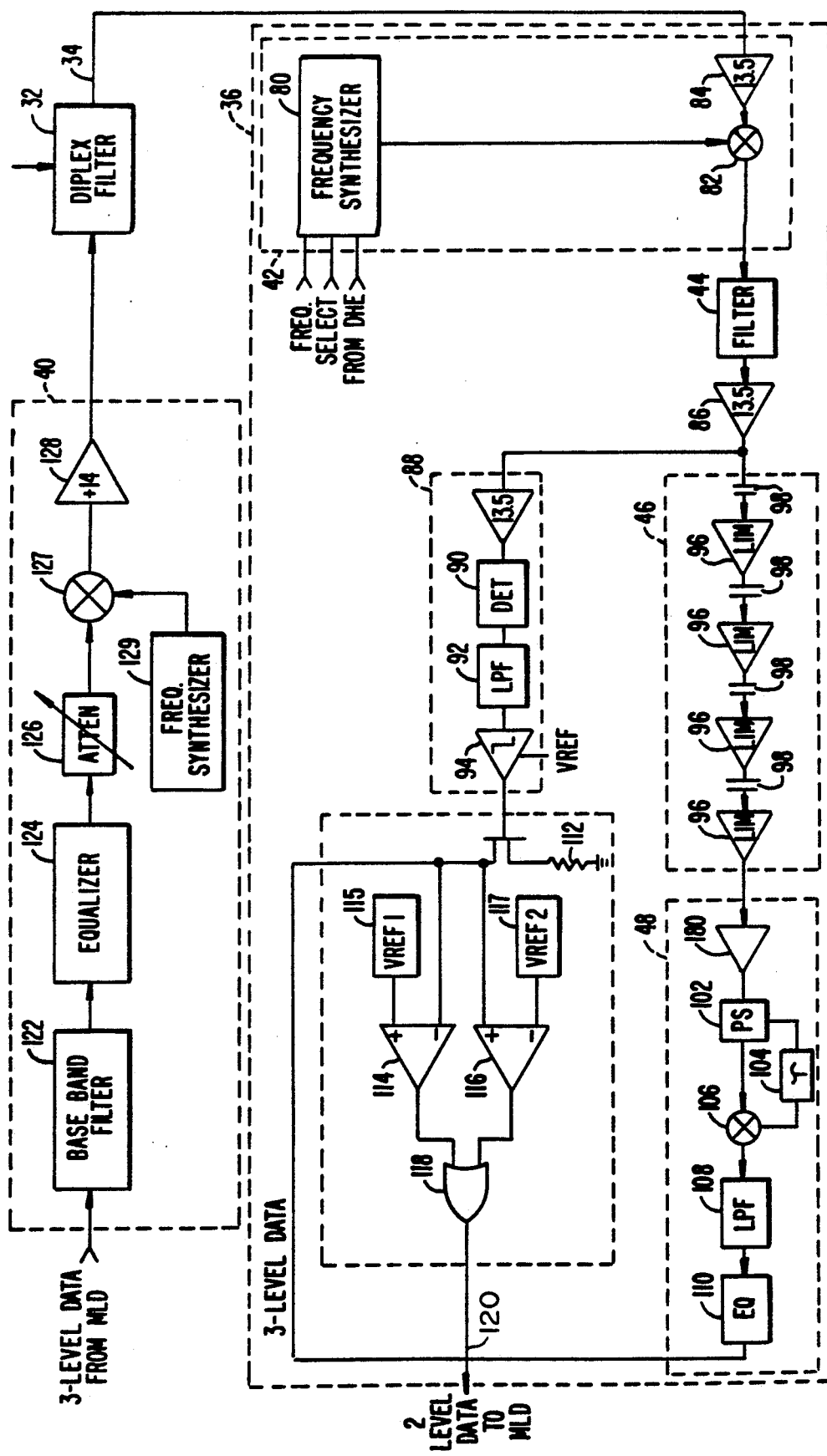
FIG._3.

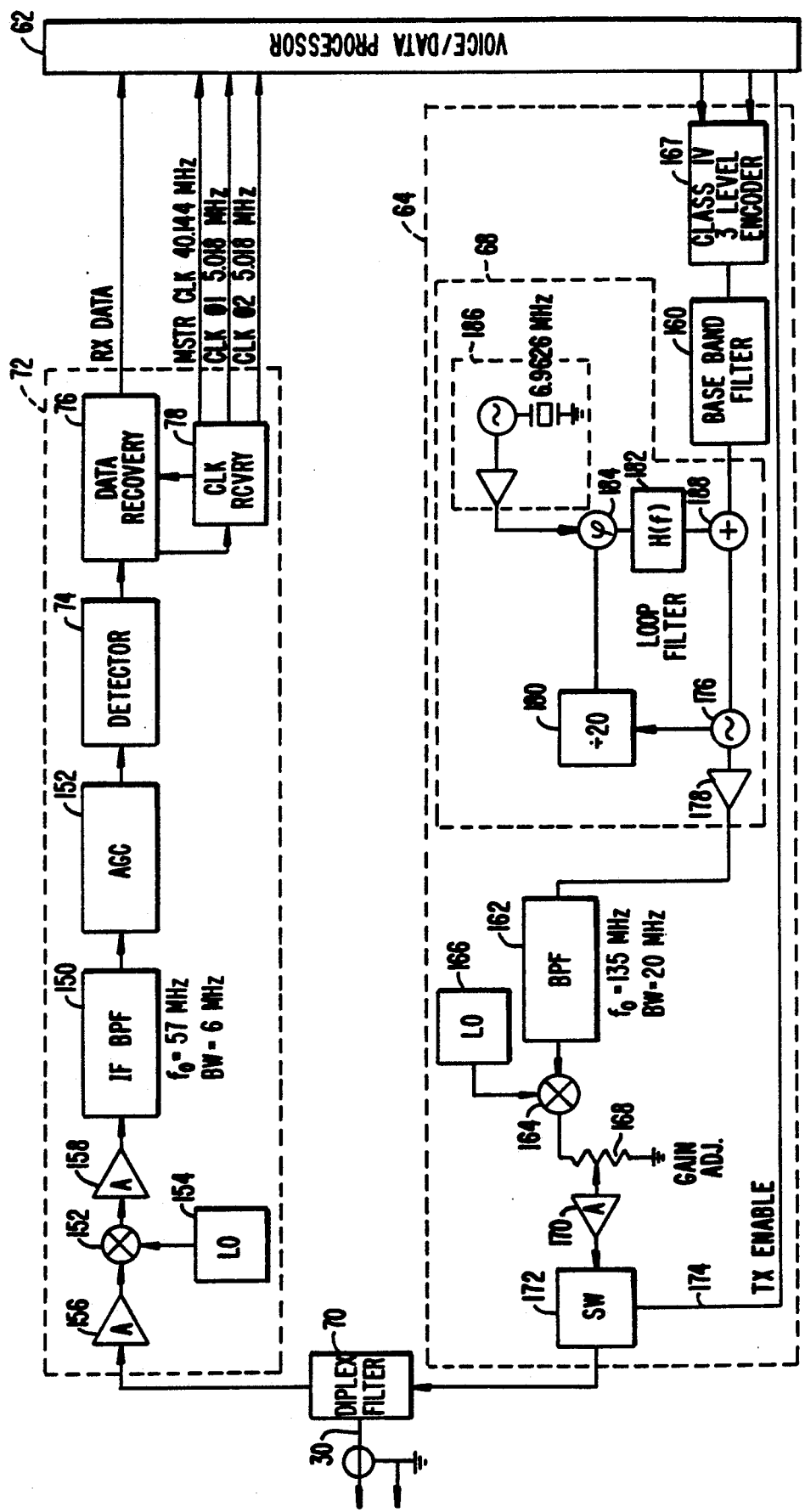
FIG._5.

MODULATION AND DEMODULATION SYSTEM EMPLOYING AM-PSK AND FSK FOR COMMUNICATION SYSTEM USING DIGITAL SIGNALS

BACKGROUND OF THE INVENTION

1. Field of the Invention

The present invention relates to a local area network communication systems suitable for use in combination of time-division multiplexing and frequency-division multiplexing in a multiple-channel broadband communications environment.

Many offices today use a network for transmission of data between personal computers, terminals and other devices within the office. Several types of architectures are used. In a star network, all nodes are coupled to a central point of the star, which provides centralized control of the flow of data. The central control on such a system can multiplex data in time from different nodes by alternately holding data in a buffer from one or the other transmitting node until a timeslot is available. A central control unit provides the synchronization necessary to insert data into assigned or available timeslots. One limitation of the star network is that the bandwidth available through the switch matrix is limited. Hence, means must be provided for multiple nodes to transmit data to the central control unit within a common broadband frequency channel.

A further system architecture employed for data communication is a token ring network. In a token ring network, a single cable or communication line is passed through each and every node, and a token packet is relayed from one node to the next, with the node desiring to transmit holding onto the token packet until its communication period is terminated. A node cannot transmit unless it has the token, and therefore, only one node is permitted to transmit at any time. This type of time-division multiplexing transmits data in irregular bursts, rather than in assigned time slots. This type of transmission is appropriate for data communications which typically occur in infrequent long bursts. Voice communications, on the other hand, require a substantially continuous connection over an extended period of time.

A still further data communication system architecture often employed for data communication is the Ethernet system. In the Ethernet system, a data node listens to see if the channel is in use before transmitting. While transmitting, the data node listens to determine if the data transmitted is received in the same form. If the received data differs, then it is assumed another node transmitted at the same time, resulting in a collision, and thus in scrambled data. The transmitting node then retransmits a packet at a random time later. Thus, neither central control of the network bandwidth acquisition of time slots nor central timing is needed.

2. Description of the Prior Art

The following patents were uncovered in a search for three-level frequency shift keyed (FSK) modulation systems.

Digital Data Modulator and Digital-to-analog Converter. U.S. Pat. No. 4,686,490. This patent discloses a digital modulator for selectably generating differential phase shift keyed (PSK) data signals and frequency shift keyed (FSK) data signals. A dibit encoder converts scrambled dibit into two phase-shifting control signals. A three-tap finite impulse response filter generates carrier phase signals by splitting each cycle of the selected carrier clock into eight phases, and, for psk operation, provides phase shifting in response to the two phase-shifting control signals. A multiplexer selects one of the phase-shifter high frequency clocks in response to the carrier phase signals. A signal selector converts the selected phase-shifted high frequency clock signal into a pulse width-modulated clock signal. The signal filter provides the PSK/FSK data signal by integrating the pulse width modulated clock signal and also provides band pass filtering to clean up the waveform. The result is reported to be a PSK/FSK data signal with low distortion, reduced transient dc, and decreased sensitivity to temperature and component selection since bit weighting resistors are not required to generate the output waveform. Also disclosed is a digital-to-analog converter/data modulator for generating FSK and PSK data signals and a method for generating frequency-modulated signals.

Processes for Generating Duo-binary FSK, Tamed FSK and TFM Modulations and Modulators Applying Those Processes. U.S. Pat. No. 4,426,710. This patent discloses methods to obtain a duo-binary FSK modulation, wherein the modulating binary signal train has a three state partial response and is fed through a precoding, a transition-type coding, a simplified msk modulation at the carrier frequency, a frequency division by two, and a multiplication by the same signal delayed by one binary element period. In order to obtain a "tamed FSK" modulation, the modulating binary signal train has a five state partial response and is fed through precoding, a transition-type coding, a simplified msk modulation at the carrier frequency, a frequency division by two, a multiplication by the same signal delayed, for one part, by one binary element period and, for another part, by two binary element periods. A tfm modulation is obtained by using the FSK duo-binary generating process. In a tfm modulator, a train of binary signals is applied to a partial response precoding circuit, the output of which is connected to a transition-type coding circuit, the output of which is connected to the input of a simplified msk modulator.

Data Encoding and Decoding Communication System for Three Frequency FSK Modulation and Method Therefor. U.S. Pat. No. 4,425,666. This patent discloses a system for three frequency FSK modulation wherein binary data bits are sequentially encoded into a ternary system of channels designated "1", "0" and "C", so that a data bit is encoded and transmitted in a "C" channel whenever it is the same as the previous data bit and wherein a transmission in the "C" channel is decoded as a continuation of the previous data bit. The data clock is recovered from the data stream at the transition between data bits and repeated data bits are detected as errors.

The following patents were uncovered in reference to a Maximum Likelihood Detection Circuit as referred to in this application:

Carrier Synchronization and Symbol Synchronization in Offset QPSK Burst Communications, U.S. Pat. No. 4,313,205. This patent describes a carrier synchronization scheme based on average phase over a periodic interval and wherein phase synchronization is achieved by reliance on the filtered and demodulated upper sideband of the output of a delay and multiply circuit.

Method for Determining the Optimum Sampling Times for a QPSK or QAM Received Signal, U.S. Pat.

No. 4,520,492. This patent describes a detector system wherein the amplitude of two quadrature components of a received signal are coupled and the point of identical amplitude is selected as the point of sampling.

SUMMARY OF THE INVENTION

According to the invention a modulation and demodulation system is provided for a network having a first broadband communications channel or transmitting bus and a second broadband communications channel or receiving bus, wherein the first broadband communications channel is for passing information upstream in bursts to a head end and the second broadband communications channel is for passing information downstream continuously from the head end to remote nodes. All nodes of the system are coupled to both the first communications channel and to the second communications channel. According to the invention, modulation of signals applied to the first communication channel is optimized for burst communication from a plurality of sources to a central or head end node, and modulation applied to the second communications channel is optimized for continuous communication from the central node to a target node. Two-way voice communication and two-way data communication can be supported simultaneously through such a dual-channel system. A system according to the invention uses a relatively small number of channels available in a broadband environment such that it can coexist with third party equipment as used in a cable television or closed circuit television system employing coaxial cabling. In a specific embodiment of the invention, communication between remote nodes and a central control unit is provided via three-level class four partial response modulation on a frequency shift keyed carrier wherein packets are communicated as bursts. Three-level class four partial response modulation provides a one bit per Hertz efficiency and exhibits a power spectral density of zero energy for zero input regardless of the differential encoding of previous states. This type of partial response coding is characterized by zero energy at d.c.

In contrast, the communication between the central unit (head end) and any one of a choice of target nodes through the second communication channel is by means of three-level class one partial response AM-PSK modulated onto a carrier, which is optimized for continuous operation. Class one partial response is an ideal format where continuous communication is contemplated because the modulator and demodulator is simple, and the demodulator is particularly inexpensive, which makes it suitable for use in a large number of slave receivers. In addition, means are provided for synchronizing the phase of signals received from remote nodes due to differences in distances between the remote nodes and the head end.

These and other aspects of the invention are clarified in the following detailed description taken in connection with the accompanying drawings.

BRIEF DESCRIPTION OF THE DRAWINGS

FIG. 1 is a block diagram of a communications system according to the invention.

FIG. 2 is a depiction of the frequency spectrum for a class four partial response signal.

FIG. 3 is a block diagram of a specific embodiment of a receiver and transmitter within a head end or central control node according to the invention.

FIG. 4 is a block diagram of a maximum likelihood detector (MLD) according to the invention.

FIG. 5 is a detailed block diagram of the rf section of a remote node for reception of a signal from the central control node and for transmission of a signal to the central control node according to the invention.

DESCRIPTION OF SPECIFIC EMBODIMENTS

Referring to FIG. 1, there is shown a communication system in accordance with the invention which comprises wideband media, preferably broadband coaxial or fiber optic cables, capable of supporting a plurality of channels simultaneously, herein designed medium 12, a head end device, commonly designated the head end retransmission unit (HRU) 14, and a plurality of node devices, herein node device A 16 and node device B 18 by way of example. Node devices A and B are, for example, voice interface units (VIU), each of which is respectively coupled to a telephone 20, 22. In addition, there may be other nodes, not shown, for connecting to the public switch telephone network, to a network manager or the like.

Each of the nodes is connected to the medium 12 through taps 24, 26, respectively, which in turn feed a tap transmission line 28, 30, respectively. In the preferred embodiment, the tap transmission lines 28, 30 are of the same medium as medium 12, capable of supporting multiple channels of communication.

The medium 12 and the tap transmission lines 28 and 30 support band-limited channels of communication, typically of about 6 MHz bandwidth per channel. In a coaxial embodiment, there are two groups of channels, typically eight channels in each group designed upstream channels and downstream channels. Upstream channels may, for example, be selected in the frequency spectrum between about 56 MHz and 100 MHz. The downstream channels may, for example, be selected to be in the frequency region between about 145 MHz and 195 MHz, all preferably having modulators and demodulators designed to operate within the defined spectrum of CATV.

According to the invention, signals originating at the node A 16 are supplied through tap 24 to one of a selected upstream channels 12U of the medium 12 to the HRU 14 wherein the signal is processed and rebroadcast to a downstream channel 12D of the medium 12 wherein it is intercepted at node B 18, processed and provided to the designated output device, such as telephone 22. According to the invention, the modulation scheme supported on the upstream channel 12U is different than the modulation scheme supported on the downstream channel 12D, the upstream channel 12U supporting a modulation scheme of burst communication, and the downstream channel 12D supporting a modulation scheme of continuous broadcast communication. In the preferred embodiment, the modulation schemes have an efficiency of 1 bit per Hertz (B/Hz), and the downstream channel contains sufficient information to recover a clock signal.

The HRU 14 comprises a diplex filter 32, coupled to the medium 12 for separating the incoming signals on the upstream channel 12U from signals placed on the downstream channel 12D. The diplex filter has an output coupled through a signal line 34 to a receiver 36 and has an input coupled to a signal channel 38 connecting it with a transmitter 40. The receiver 36 is a receiver suited to demodulate and detect a signal applied through the upstream channel 12U to the HRU 14. In a specific embodiment according to the invention, the receiver 36 comprises a superhetrodyne frequency shifter 42 whereby the broadband signal is shifted to an intermediate frequency, a bandpass filter 44 coupled to receive the output of the superhetrodyne frequency shifter 42, a limiter circuit 46 coupled to receive the output of the baseband filter 44, a discriminator circuit 48 coupled to receive the output of the limiter circuit 46, and a three-level to two-level converter 50 coupled to receive the output of the discriminator circuit 48. The three-level to two-level converter converts three-level data into two-level data for further processing. The output of the converter 50 is provided to a maximum likelihood detector (MLD) 52, the function of which is to adjust in time the bit position of each received signal so that the system clock can strobe received data in the middle of the signal representing the digital bit. Its output is provided to a transmitter 40, in a preferred embodiment, in a three-level code, initially to a baseband filter 54. The output of the baseband filter 54 of the transmitter 40 is provided to an equalizer 56, the output of which is provided to a modulator 58. The modulator 58 modulates the data signal to the chosen downstream channel frequency for transmission. The output of the modulator 58 is provided to an amplifier 60, which, in one or more amplifier stages, generates sufficient RF signal output to support signals in the downstream channel 12D. The output of the amplifier 60 is provided on signal line 38 to the diplex filter 32 which in turn directs the signal to the downstream channel 12D.

Signals are supplied to the medium 12 from the nodes, for example, from node device A 16. Node device A 16 receives a signal in appropriate format from a telephone or data source, which is formatted in an appropriate voice/data processor 62. The voice/data processor 62 generates the formats with protocols necessary to supply the information in its appropriate hierarchy of transmission. The details of a the voice/data processor 62 depend on the nature of protocols not directly relevant to the present invention.

Encoded data is applied from the voice/data processor 62 to a transmitter 64. The transmitter 64 includes an encoder 66 and a modulator 68 operative in accordance with a specific embodiment of the invention. The encoder 66 is coupled to receive a digital data stream from the voice/data processor 62 and to supply an encoded signal to the modulator 68, and the modulator 68 modulates the encoded signal to the appropriate channel of the upstream channel 12U. The output of the modulator 68 is supplied to a diplex filter 70 which is coupled to the tap transmission line 28. Signals received through the diplex filter 70 on the tap transmission line 28 from the downstream channel 12D are coupled to a receiver 72, which is a subsystem suited to receive signals on the downstream channel as encoded via MLD 52 of the HRU 14.

The subsystems and elements of the node B device 18 are identical to those of the node A device 16 and have been so designated. Referring to the node B device 18, an example of one specific receiver 72 in accordance with the invention, is illustrated. The receiver 72 of the node B device 18 comprises an envelope detector 74 coupled to receive signals from the diplex filter 70 and to provide a detected signal to a decoder 76 whereby received data is output to a voice data processor 62. Associated with a decoder 76 is a clock recovery circuit 78 which is operative to extract a clock signal from the received data and to apply the recovered clock to the decoder 76 as well as to the voice/data processor 62.

In accordance with a specific embodiment of the invention, the transmitter 64 of the node devices 16, 18 employs a class 4 three level partial response modulation scheme having three frequency shift keyed frequencies, $F_0-\Delta$, $F_0$ and $F_0+\Delta$, where in the specific embodiment, delta is approximately 2 MHz. Class 4 partial response modulation in three levels provides a bit efficiency of 1 bit per Hertz. Class 4 is employed because it is a line code having no energy at d.c. Referring to FIG. 2, there is shown a power spectrum of a class 4 signal. At the d.c. point 101 and at the point of twice the center frequency 103, the power in the power spectrum is always zero. At the center frequency point 105, the power is maximum. In the present embodiment, the power spectrum center frequency has been selected to be 2.5 MHz. Thus, the full bandwidth of the class 4 spectrum is 5 MHz with no energy at d.c. or above 5 MHz. Because there is no energy into d.c., there is no need to provided direct coupling for the three-level data to a frequency shift keyed oscillator. Consequently, the frequency shift keyed oscillator can be phase locked through a narrow bandwidth phase locked loop, that is, a loop having a bandwidth of less than 5 MHz, to the correct center frequency. When signal modulation is added to provide class 4 three level modulation at baseband, it will deviate the carrier outside of the loop bandwidth and thus produce the desired modulation at the appropriate channel frequency.

Class 4 code is a unique line code in that it produces a zero output at the conclusion of each packet regardless of the differential encoding comprising some of the states characteristic of a partial response code. The partial response produces an output which is the sum of the present modulation state or level and the previous modulation state or level. The modulation format herein employed according to a specific embodiment of the invention gives one bit per Hertz spectral efficiency and yet has zero energy at d.c.

FIG. 3 illustrates a specific embodiment of a receiver 36 and a transmitter 40 within the head end device 14. In accordance with the invention, the receiver 36 is adapted to receive digital data in a first structured form and the transmitter 40 is adapted to relay the same digital data in a structured form different from the received form. Within the receiver 36 is a superhetrodyne frequency shifter 42 which comprises a frequency synthesizer 80 coupled to a mixer 82 to which is supplied the input signal from signal line 34 through an amplifier 84. The output of the mixer 82 is provided to the bandpass filter 44, which is a filter network producing an output signal at an intermediate frequency (IF). The center frequency of the signal may, for example, be about 25 MHz, and the filter 44 may have a center frequency of about 25 MHz with a bandwidth of about 6 MHz.

The output of the baseband filter 44 may be provided to an amplifier 86 which in turn is coupled to carrier detector circuit 88 and also to a limiter circuit 46. The carrier detector circuit may include a conventional envelope detector 90, such as a diode, the output of which is coupled through a lowpass filter 92 to a comparator 94. The output of the comparator 94 is a two-level signal indicating presence or absence of a carrier.

The limiter circuit 46 may comprise a cascade of one or more limiter modules 96 which may optionally be a.c.-coupled through a capacitor 98 to one another and then coupled to the frequency discriminator circuit 48.

Because there is no energy at d.c., there is no need to direct couple to the frequency discriminator 48. The frequency discriminator 48 includes, for example, an amplifier 100 coupled to a power splitter 102. The power splitter 102 has an output coupled through a delay circuit 104, which introduces, for example, a 75 nanosecond delay, and another output is provided to a mixer 106. A second input from the mixer 106 is from the delay circuit 104, thereby mixing two signals which in turn produces a product which is provided to a low-pass filter 108. The output of the lowpass filter 108 is provided to an equalizer 110, the output of which is three-level data representing 1, 0 and −1. Three level data is fed to a three-level to two-level converter circuit 50 which is activated when the carrier detect signal is logically True from carrier detector 88. A switch 112 serves to activate the converter 50. The converter 50 consists of first and second comparators 114 and 116, the outputs of which are fed through an OR gate 118 to a two level data output line 120. The comparators 114 and 116 are respectively referenced to a positive or high-voltage reference 115 at a noninverting terminal and to a negative or low-voltage reference 117 at an inverting terminal such that three distinct input levels at the respective comparator inputs are converted to either a True (representing the presence of a 1 or −1 signal level) or a False (representing a signal level between the respective voltage reference threshold levels).

The output on the two-level data output line 120 is provided to the MLD 52, as explained hereinbelow.

The transmitter section 40 comprises a baseband filter 122 which receives three-level input data from the MLD 52 and provides an output signal to an equalizer 124. The output of the equalizer 124 is fed through attenuator 126 as necessary to provide output level adjustment and thereafter, through a mixer 127 which also received an input from a frequency synthesizer 128 and produces an output at the desired output frequency for the downstream channel 12D (FIG. 1) through the amplifier 128 and the diplex filter 32. The modulation provided by the transmitter 40 is a three-level class one partial response encoding scheme AM-PSK modulated onto a carrier, which yields one bit per Hertz spectral efficiency. Class one partial response modulation is a preferred format for simple modulators and demodulators where the signal is operating is a continuous mode. Where the signal is continuous, a received signal can be averaged and used to produce an automatic gain control signal to provide the desired gain. The signal originates as a burst signal at the head end. However, in the MLD 52, the signal is merged with a head-end pseudo signal consisting of a bit stream of 1 0 1 0 1 0 in the preferred implementation. Information from the source of burst signal is merged to provide the desired encoding. Thus, the head end transmitter 40 always generates and transmits a continuous carrier to the downstream channel 12D.

Referring to FIG. 4, there is shown a block diagram of one type of maximum likelihood detector (MLD) 52 suitable for use in accordance with the invention. The MLD 52 comprises a shift register 130, a bit stream combiner 132 and a two-level to three-level data converter 134. The shift register 130 has associated therewith a high-speed clock 136 and a bit synchronizer 138. The bit stream combiner 132 has associated therewith a continuous pseudo data source 140, a function of which is to provide a continuous string of pseudo data, for example, 1 0 1 0 1 0 format data in a pseudo-idle state. The bit stream combiner combines data received from the continuous pseudo data source 140 and data received from he shift register 130 into a continuous data stream. The continuous data steam is then provided to the data converter 134 where two level data is converted to three level data. The output of the data converter 134 is coupled to the transmitter 40 of the HRU 14.

The purpose of the MLD 52 is to align data for optimum reception. The various signals received in burst mode through the HRU receiver 36. Each exhibit different phases as a result of differences in distance along the upstream channel 12U from the HRU 14, as well as differences in filter delays and differences in the phase of any local clock. The MLD 52 adjusts for differences in the phase of the input data so that the system clock used in connection with receiving the data in a synchronous format can strobe the received data at or near the midpoint of the bit in the bit stream. To this end, the shift register 130 is clocked by a high speed clock 136 at, for example, eight times the input data rate whereby each input bit is shifted to eight possible positions in turn for output at a selected tap 142, 144, 146, 148, 150, 152, 154 or 156. In the specific embodiment, each tap of the shift register thus presents an output data stream differing in time delay by one eight bit from the adjacent tap. The bit synchronizer 138 monitors each one of the taps and selects by means of appropriate optimization a bit stream from one of the taps, providing as its output a bit stream to the bit stream combiner 132. The bit synchronizer 138 may, for example, include a multiplexer and means for checking each of the input bit streams for errors due to sampling at a less than optimum phase. Should it be deemed unnecessary to adjust the phase automatically, the bit synchronizer may comprise a simple selector switch coupling one selected tap through to the bit stream combiner 132.

MLD 52 operates by having the bit synchronizer 138 examine the data bits as they pass along the shift register 130. The time relationship between the rising edges and the falling edges of the data bits are compared to those of the system clock. Based upon the calculations made by the bit synchronizer 138, the appropriate shift register tap among the eight possible taps 142-156 is used to extract the data and send it to the bit stream combiner 132. This calculation estimates the center of the data bit.

The center of the data bit must be known relative to the system clock. (The system clock is derived from the high speed clock 136 which also runs the shift register 130.) The bit synchronizer 138 examines one of the lines 142-156 and notes when the edges of the data bits occur with respect to each other and with respect to the system clock. The time relationships are measured in terms of the periods of the high speed clock 136. This examination occurs on the first portion of the incoming data stream which has a preamble especially designed to ease the task of the bit synchronizer (usually a 1 0 1 0 1 0 1 0 sequence) and also to allow the synchronization process to occur before the message bits arrive.

Referring again to FIG. 5, the data clock CLK phase 1 and CLK phase 2, at the nodes is derived from the bit rate of the continuous downstream bit rate transmitted by the head end 14. Thus, the burst transmissions from the nodes 16, 18 to the head end 14 are at a frequency known to the head end 14 but at an unknown phase. Once the MLD 52 determines the phase, that phase is constant throughout the burst transmission from the node 16 or 18. Therefore, once the MLD 52 ascertains the phase of the preamble it does not make any further adjustments for the remainder of the burst transmission from the node 16 or 18.

The center of the bit times are calculated by taking the bit period, that is, the time between the start and the end of a bit as measured in high speed clock 136 periods, and dividing by two. This measurement can be made by a counter within bit synchronizer 138 which is started when a bit transition occurs and is stopped when the next transition occurs. A similar counting method can be used to determine the time relationship between the bit edges and the master clock edges. The appropriate shift register 130 output 142-156 to take the data from is found from the time relationships between the data edges and the master clock edge. The implementation can be done from a look-up table in a memory within the bit synchronizer 138 or can be calculated in real time with either hardwired logic or a fast dedicated microprocessor.

Within the transmitter 40, the output of the equalizer 124 through the attenuator 126 is provided to a mixer 127, the output of which is coupled to the amplifier 128. The mixer 127 is coupled to a frequency synthesizer 129 which supplies the local oscillator signal used to select the channel for the downstream channel 12D.

Referring now to FIG. 5, there is shown a detailed block diagram of the RF section of a node device, for example, node device B 18 in accordance with the invention, having a receiver 72, a diplexer 70 and transmitter 64 and voice/data processor 62. Understanding of the voice/data processor 62 is not necessary to understand the present invention. Its function is to provide transmit data to the transmitter 64, together with any clock signals and control signals, and to receive data from the receiver 72, as well as a master clock signal and other related clock signals.

Referring to the receiver 72, there is shown a simple detector 74 with decoder 76 and clock recovery circuit 78. The circuitry operates at an intermediate frequency, and to this end is provided with an intermediate frequency bandpass filter 150 with a center frequency of 57 MHz and a bandwidth of 6 MHz. It is coupled to receive a signal from a mixer 152 which is coupled to receive a local oscillator signal from a local oscillator 154 and the information-carrying signal through a buffer amplifier 156. The output of the IF bandpass filter 150 is coupled to an automatic gain control circuit 152. The output of the automatic gain control circuit 152 is coupled to the detector 74, which may be a diode type envelope detector. A data recovery circuit 76 is coupled to received the output of the envelope detector 74.

The signal received through the diplex filter 70 is a partial response three level class one signal, which has a desired a one bit per Hertz spectral efficiency. The class 1 partial response format is an ideal format for a simple modulator and demodulator so long as the system is operating in a continuous mode. The operation in a continuous mode allows the incoming signal to produce an AGC signal at the AGC circuit 152 providing compensation for the dynamic range of variations which can be expected at the input. The data recovery circuit is a simple bit synchronous detector which allows recovery of the bit stream in connection with the recovered clock signal from a clock recovery circuit 78. The data recovery circuit may, for example, be a J-K flipflop clocked by a recovered clock signal, where its output is fed to a suitable buffer of the voice/data processor 62. The clock recovery circuit 78, may be a voltage controlled oscillator which is steered or triggered by the edge of the transitions derived from data extracted from the data recovery circuit.

The transmitter 64 comprises a class four three level encoder 71 coupled through a bandpass filter 160 to a burst modulator 68. The output of the burst modulator 68, which is an analog phase locked loop, is coupled to a bandpass filter 162, the output of which is coupled through a mixer 164 which is coupled to a local oscillator 166. The output of the mixer 164 is provided through a gain adjustment circuit 168 to an output amplifier 170, and the output amplifier 170 is fed through a PIN switch 172 to the diplex filter 70. The PIN switch 172 is controlled by a transmit enable line 174 and is used to gate the signal burst applied through the diplex filter 70 to the tap transmission line 30.

The burst modulator 68 comprises a phase-locked loop consisting of a steered oscillator 176 having one output coupled to an output buffer amplifier 178 and another output coupled to a divide-by-20 circuit 180, the output of which is coupled to a phase detector 184 which compares phase with a stable frequency source 186. The output of the phase detector 184 is coupled to a loop filter 182 whose output is coupled to a summing junction 188 which also receives as input the output of the baseband filter 160. When there is no data being received from the voice/dataprocessor 62, the class IV 3 level decoder (71) output is at zero volts and zero energy, which allows the phase locked loop feedback circuit in the burst modulator 68 to remain at the center of the three possible frequencies. The switch 172 is in the off condition during these times. When the voice/data processor 62, has data to be transmitted, it turns on the switch 172 which allows a signal to be sent to the diplex filter 70. The class IV 3 level encoder 71 then receives data from the voice/data processor 62 and passes it to the burst modulator 68 via the baseband filter 160. This frequency modulates the burst transmitter 68 between the three possible frequencies in accordance with the 3 level encoded data. At the end of the data packet, the class IV 3 level encoder output is at zero volts and zero energy, and the switch 172 is turned off.

The invention has now been explained with reference to specific embodiments. Other embodiments will be apparent to those of ordinary skill in this art. Therefore, this invention is not to be limited except as indicated by the appended claims.

We claim:

1. A communication system comprising:
   a head end device coupled to a first broadband communications medium to receive and translate bursts of information received in a partial response format into continuous information in a partial response format and to transmit said continuous information to a second broadband communications medium;
   a first broadband communications medium coupled to said head end device;
   a second broadband communications medium coupled to said head end device; and
   a plurality of node devices, each one of said node devices having modulator means coupled to said first broadband communications medium for transmitting signals upstream to said head end device and having demodulator means coupled to said second broadband communications medium for receiving signals downstream from said head end device, each said modulator means comprising means for communicating bursts of information in a partial response format with zero energy output for a zero value input, and each said demodulator means comprising means for receiving continuous information in a partial response AM-PSK format.

2. The communication system of claim 1 wherein said modulator means comprises means for transmitting said bursts of information with an efficiency of one bit per Hertz.

3. The communication system of claim 2 wherein said head end device means comprises means for transmitting said continuous information with an efficiency of one bit per Hertz.

4. The communication system of claim 3 wherein said first boardband communication medium and said second broadband communication medium are separate frequency channels on a single physical medium and said head end device includes a frequency translating means.

5. The communication system of claim 4 wherein said head end translating means further comprises means for aligning in time a first bit pattern of said information of said partial response format with zero energy output for a zero value input to synchronize said bit pattern of said information with a repetitive bit pattern in order to allow extracting of bits at an optimized time.

6. A method for transmitting information in a coded bit pattern from a source node to a target node in a communication system having a system clock and a unidirectional transmitting medium terminating at a head end said information being translated at said head end onto a unidirectional receiving medium originating from said head end, comprising the steps of:
  transmitting said information as a class four, three-level partial response signal on a three-frequency shift keyed (FSK) carrier on said transmitting medium from said source node;
  receiving said class four partial response signal with a frequency modulation (FM) receiver at said head end to obtain a received signal;
  hard limiting said received signal with a limiter circuit means to obtain a limited signal within a dynamic range suitable for discrimination;
  discriminating said limited signal with a discriminator circuit means to extract a coded bit pattern of said information;
  transmitting continuously a class one, three-level partial response signal on a continuous carrier on said receiving medium from said head end;
  modulating said continuous carrier with said coded bit pattern of said information when said coded bit pattern of said information is present and modulating said continuous carrier with a repetitive bit pattern when said coded bit pattern of said information is not present;
  receiving said continuous carrier at said target node on said receiving medium;
  detecting said modulated continuous carrier with an envelope detector means; and
  extracting said coded bit pattern of said information from said modulated continuous carrier by strobing said coded bit pattern in synchronism with said system clock.

7. The method of claim 6 further comprising the step of aligning in time said coded bit pattern of said information at said head end to synchronize said coded bit pattern of said information with said repetitive bit pattern in order to allow extracting of bits at an optimized time.

8. The method of claim 6 further comprising the step of digitizing a voice to produce said information.

9. The method of claim 6 wherein said class four partial response signal transmitting step includes asynchronously transmitting said information in bursts.

10. A communication system for transmitting a unit of information in a coded bit pattern from a source node to at least one target node comprising:
  a head end;
  a unidirectional transmitting medium coupling each node in a source path to and terminating at said head end;
  a unidirectional receiving medium originating from said head end and coupling to each said target node;
  means at said source node for transmitting said unit of information as a class four, three-level partial response signal on a three-frequency shift keyed (FSK) carrier on said transmitting medium from said node;
  said head end comprising;
  a) head end receiving means at said head end for receiving said class four partial response signal with a frequency modulation (FM) receiver at said head end to obtain a received signal, said head end receiving means including:
    1) a limiter circuit means for hard limiting said received signal to obtain a limited signal within a dynamic range suitable for discrimination; and
    2) a discriminator circuit means for discriminating said limited signal to extract a coded bit pattern of said information;
  b) head end translating means for transferring signals received at said head end of said transmitting medium to said receiving medium;
  c) means for transmitting continuously a class one, three-level partial response signal on a continuous carrier on said receiving medium from said head end; and
  d) means for modulating said continuous carrier with said coded bit pattern of said information when said coded bit pattern of said information is present and modulating said continuous carrier with a repetitive bit pattern when said coded bit pattern of said information is not present; and
  target node receiving means for receiving said continuous carrier at said target node on said receiving medium, said target node receiving means including:
  a) envelope detector means for detecting said modulated continuous carrier; and
  b) analog to digital converting means for extracting said coded bit pattern of said information from said carrier by strobing said coded bit pattern in synchronism with a system clock.

11. The communication system of claim 10 wherein said head end translating means further comprises means for aligning in time said coded bit pattern of said information with said repetitive bit pattern in order to allow extracting of bits at an optimized time.

12. The communication system of claim 10 further comprising means, coupled to said source node, for digitizing a voice signal to produce said information.

13. The communication system of claim 12 wherein said transmitting medium and said receiving medium are separate frequency channels on a single physical medium and said translating means includes a frequency translator.

14. The communication system of claim 13 further comprising a plurality of transmitting and receiving channels on said physical medium, each of said nodes having means for transmitting and receiving on more than one channel.

15. A communication system comprising:
a head end device;
a plurality of node devices wherein a unit of information is transmitted in bursts from each node device to said head end device via a first medium in a partial response format with zero energy output for a zero value input, and then is transmitted in a continuous bit stream from said head end device to each designated node device via a second medium; and
means for synchronizing the phase of said unit of information transmitted from each node device and received by said head end device; said synchronizing means adapted to strobe the midpoint of said unit of information.

16. A method for transmitting a unit of information from a plurality of node devices to a head end device in a communication system having first and second transmitting mediums comprising the steps of:
transmitting said information in bursts via said first medium in a partial response format with zero energy output for a zero value input;
receiving said partial response formatted information bursts at said head end;
synchronizing the phase of said information received from said nodes with the head end system clock said synchronizing means adapted to strobe the middle of said information bursts; and
transmitting said received information bursts from said head end in a continuous bit stream to each designated node device via said second medium.

* * * * *